UNITED STATES PATENT OFFICE.

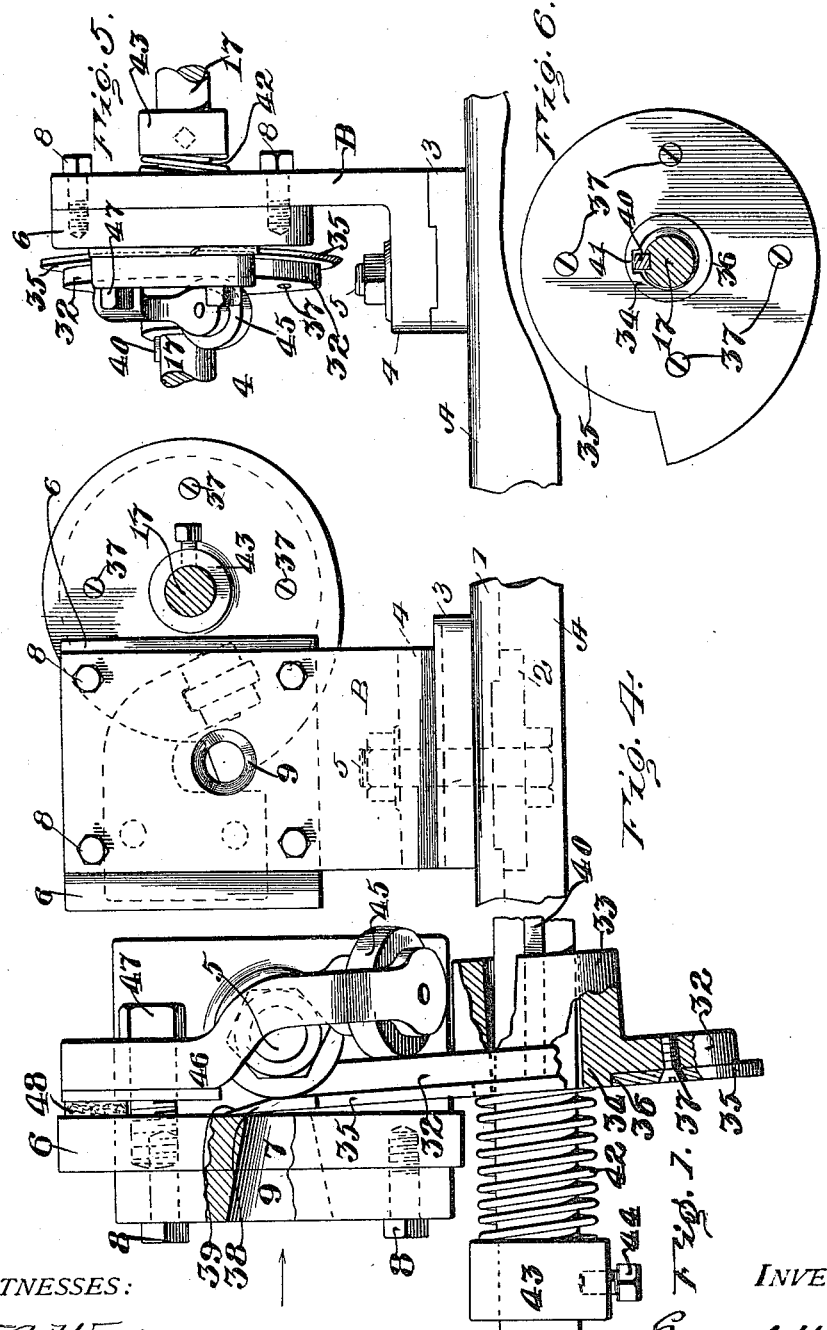

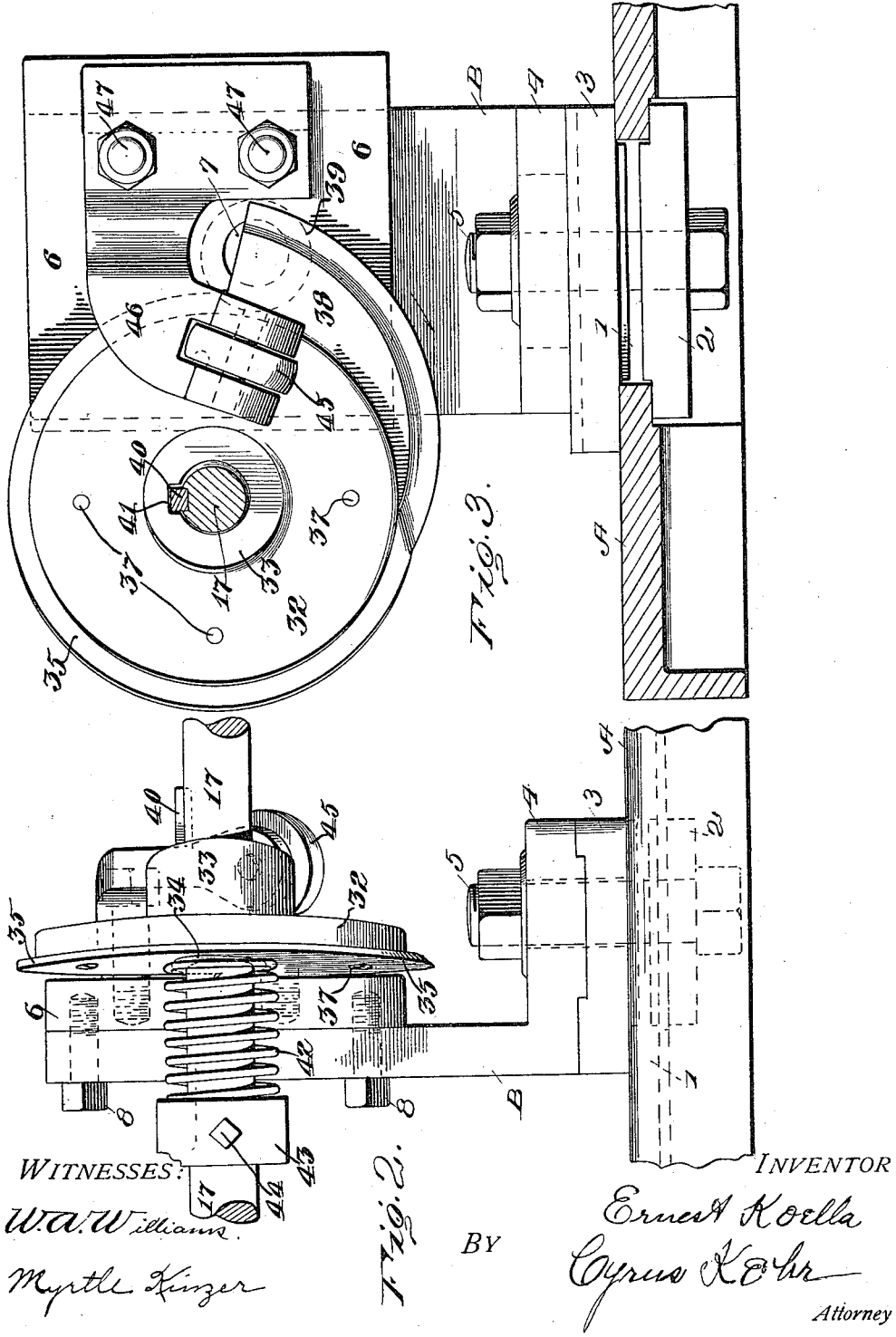

ERNEST KOELLA, OF KNOXVILLE, TENNESSEE.

CUTTING MECHANISM.

1,143,285.  Specification of Letters Patent. Patented June 15, 1915.

Application filed November 29, 1911, Serial No. 663,088. Renewed April 16, 1915. Serial No. 21,848.

*To all whom it may concern:*

Be it known that I, ERNEST KOELLA, a citizen of the United States, residing at Knoxville, in the county of Knox and State of Tennessee, have invented a new and useful Improvement in Cutting Mechanism, of which the following is a specification, reference being had to the accompanying drawing.
My improvement relates particularly to mechanism for cutting relatively long bodies of material transversely at intervals while said bodies are moved through or pass the cutting mechanism.
The improvement comprises two cutting members which operate in conjunction with each other with a shearing action.

The object of the improvement is to provide for a yielding and varying engagement between said cutting members, in order that the cutting edges of said members may make close and accurate engagement only during the cutting period and be free from each other during the intervals between the cutting periods. In the form herein illustrated, one of the cutting members is a stationary plate while the other cutting member is a rotary plate.

In the accompanying drawings, Figure 1 is a plan of a mechanism embodying my improvement; Fig. 2 is a side elevation of the apparatus shown in Fig. 1 looking from the front in Fig. 1; Fig. 3 is an end elevation looking toward the left in Figs. 1 and 2; Fig. 4 is an end elevation looking toward the right in Figs. 1 and 2; Fig. 5 is a rear elevation looking from the rear in Fig. 1 and toward the left in Fig. 3; Fig. 6 is an elevation of the rotary cutting member, looking from the left as shown in Fig. 1.

Referring to said drawings, A is a base plate upon which the operating parts are supported.

B is a standard for supporting the stationary cutting member. A drive shaft, 17, supported in suitable bearings, not shown, carries a rotary cutting member, as hereinafter described.

In the base is a slotted guide way, 1, to which are applied a lower clamp plate, 2, and an upper clamp plate, 3. The standard, B, comprises a foot, 4, resting upon the upper clamp plate, 3. A bolt, 5, extends through said foot and said clamp plates and binds said three members firmly to each other and to the base, whereby the standard, B, is set immovably. The stationary cutting member, 6, is applied immovably to the standard B. Said cutting member is in the form of a steel plate made extremely hard and having an opening with a cutting edge at the righthand face of the plate and along the lower and rear quarter of the opening. In the particular form shown in the drawings, said opening is in the form of a truncated cone, the smaller end being at the right and the entire righthand edge being made equally sharp as a result of the method of forming said opening; but, as will hereinafter appear, only the lower, rear quarter of said edge is used in cutting. Said plate-form cutting member is secured to the standard, B, by means of four screw bolts, 8, extending through the standard into said member. Axially in line with the opening, 7, of the plate-form cutting member, the standard, B, has an opening, 9, which is also in the form of a truncated cone, the smaller part of the same diameter as the larger part of the opening, 7, so that said openings together form a port, passage, or conduit, in the form of a truncated cone. Said port or passage constitutes a guide-way or conduit for conducting the material to be cut into position for engagement by the cutting edges of the two cutting members.

The body of the material to be cut may be regarded as constituting a rope, for said body may be an ordinary rope or a rope-like body composed of any material adapted to be moved forward through said guide way intermittently and cut transversely by said two cutting members during the intervals between the forward movements of said rope-form mass. For thus feeding the rope forward longitudinally through the conduit formed by the openings in the standard and the plate-form cutting member, any suitable means may be used, for example, the feeding mechanism described for a like purpose in my application, Ser. No. 511,394, filed August 5, 1909, for Letters Patent for a sewing machine, such mechanism operating during the separation of the cutting edges of the two cutting members from each other.

Opposite and a little to the right of the standard, B, the drive shaft, 17, is surrounded by a disk, 32, having a hub, 33, formed integral with the disk at the righthand side of the latter. At its lefthand side, the disk has an annular neck, 34, formed integral therewith. The disk and the hub may be regarded as together constituting a hub for the rotary cutting member which is secured to said disk. The rotary cutting member, 35, is in disk-form and has a central opening, 36, see Figs. 1 and 6, into which the neck, 34, extends. Screws, 37, extend through the cutting member, 35, into the disk, 32, and bind said member securely to said disk. The cutting member, 32, has a lateral eccentric extension, 38, provided with a cutting edge, 39. The sizes of the rotary cutting member and of the extension, 38, are such as to cause the cutting edge to sweep across the opening, 7, of the stationary cutting member during clock-wise rotation of the rotary cutting member. A key or feather, 40, on the drive shaft, 17, extends into a groove, 41, in the bore of the hub, 33, whereby the rotary cutting member is allowed to slide lengthwise on said shaft but is made to rotate in unison with said shaft. But the bore of the hub is made larger than the diameter of said shaft and the groove, 41, is made wider than said key, in order that said hub and its disk and the rotary cutting member may tilt or cant out of perpendicular to said shaft, for the purpose of placing the cutting members at an angle to each other while the cutting edge of the rotary cutting member traverses the face of the stationary cutting member. This can be accomplished by enlarging the bore of said hub only at opposite sides of the shaft adjacent a plane containing the axis of said shaft and cutting the larger portion of the extension, 38. The hub, 33, the disk, 32, and the rotary cutting member, 35, may be together regarded as constituting the rotary cutting member, for the hub and the disk are a single piece and the member, 35, is secured immovably to said single piece so that these two pieces move in unison, just as would be the case if they were actually a single piece. They are made two pieces for the sake of convenience. The member, 35, can be formed and tempered more readily in the shape of a flat and relatively thin plate.

At the left of the rotary cutting member, an expanding coiled spring, 42, surrounds the drive shaft, 17, and bears by its righthand end against the member, 35, or the neck, 34, (the drawings show the latter) and by its lefthand end against a collar, 43, which surrounds the drive shaft and is held in fixed position thereon by means of a set screw, 44. Said spring presses the rotary cutting member rightward. Such action is resisted by an anti-friction roller, 45, supported by a bracket, 46, which is secured to the righthand face of the stationary platform cutting member, 6, by means of two screw bolts, 47. The bracket is given a bearing against the stationary cutting member rearward of said screw bolts by inserting a piece of leather, 48, between said bracket and the stationary cutting member at the rear of said screw bolts. By turning said screw bolts inward, the roller, 45, is made to bear with greater force against the disk, 32. And by turning said screw bolts outward, the pressure of said roller against said disk is reduced. By moving the collar, 43, toward the right on the drive shaft, the pressure of the spring, 42, against the rotary cutting member or the neck, 34, is increased; while the moving of said collar leftward on the drive shaft serves to decrease the pressure of said spring against said rotary cutting member.

It is desirable to have only the cutting edge, 39, of the rotary cutting member bear against the adjacent face of the stationary cutting member when the extension, 38, is traversing the stationary cutting member, no contact being made between the adjacent faces of the two cutting members. To produce this condition calls for a tilting or canting of the rotary cutting member upon the drive shaft, the rear portion of the rotary cutting member being turned leftward and the forward portion of said cutting member being turned rightward with reference to a plane to which the drive shaft is perpendicular. Such tilting or canting is, as already described, permitted by the enlargement of the interior of the hub, 33. The roller, 45, is set far enough rightward to permit the cutting edge, 38, to bear against the righthand face of the stationary cutting member, 6, while the lefthand face of the rotary cutting member stands at a short distance from the adjacent face of the stationary cutting member, thus placing the cutting members at an angle to each other, the cutting edges being at the apex of the angle. The spring, 42, pushes said rotary member rightward until its disk bears against the roller, 45, and then, with said roller as a fulcrum, tilts the rotary cutting member until the cutting edge, 39, bears against the adjacent face of the stationary cutting member.

When the rotary cutting member is turned far enough to bring the extension, 38, to the lower edge of the stationary cutting member, 6, said extension will slide out of engagement with the stationary cutting member, and as fast as that occurs, said extension is moved leftward below the lower edge of the stationary cutting member, in response to the continued righthand pressure of the spring, 42, the rotary member, 35, and its disk, 32, being further tilted with the face of the roller, 45, as a fulcrum.

The degree of the angle between the adjacent faces of the two cutting members when the cutting edge of the rotary cutting member bears against the face of the stationary cutting member is determined by the position of the roller, 45. If said angle is to be reduced, the roller is moved toward the stationary cutting member by tightening the screw bolts, 47, and if said angle is to be increased, the roller is put farther away from the stationary cutting member by turning the screw bolts outward, the spring, 42, in each case pressing the rotary cutting member rightward so as to cause tilting with said roller serving as a fulcrum. Separate from this variation of angle, there may be a variation of pressure of the cutting edge, 38, against the adjacent face of the stationary cutting member. This variation is effected by shifting the collar, 43, after the roller, 45, has been set to produce the desired angle between the adjacent faces of the two cutting members.

Attention is directed to the fact that the best possible shearing action results from this close pressing of the cutting edge of the rotary cutting member against the face of the stationary cutting member, in order to bring the two cutting edges into the most direct and intimate opposition. It is also to be observed that the rotary cutting member is held in elastic manner, notwithstanding that the bracket, 46, and the roller, 45, are relatively rigid; for the spring, 42, yields to allow the rotary cutting member to move leftward in response to demands made by any slight irregularities on the roller, 45, or on the righthand face of the disk, 32, against which the roller, 45, bears. Thus we have a cutting mechanism operating by shearing action and comprising two cutting members standing at an inclination to each other and yieldingly engaging each other. And it is to be noted that the parts can be so proportioned and adjusted as that the two cutting members will engage each other only when the extension, 38, crosses the face of the stationary cutting member.

By reference to Fig. 3, it will be observed that the operative portion of the stationary cutting member, 6, is the rear lower quarter of the righthand edge surrounding the opening or passage, 6, of said cutting member.

I claim as my invention:

1. In a cutting mechanism, the combination of two cutting members each having a face over-lapping such face of the other cutting member and a portion of the edge of each such face being a cutting edge adapted to work in opposition to the cutting edge of the other member, yielding means for relatively bodily moving said cutting members from each other, in a course approximately perpendicular to said faces, and tilting one of said cutting members to make its cutting edge bear against the adjacent face of the other cutting member, substantially as described.

2. In a cutting mechanism, the combination of two cutting members each having a face over-lapping such face of the other cutting member and a portion of the edge of each such face being a cutting edge adapted to work in opposition to the cutting edge of the other member, means for yieldingly bodily moving one of said cutting members from the other cutting member, in a course approximately perpendicular to said faces, and tilting said cutting member toward the other cutting member to make its cutting edge bear against the adjacent face of the other cutting member, substantially as described.

3. In a cutting mechanism, the combination of two cutting members each having a face over-lapping such face of the other cutting member and a portion of the edge of each such face being a cutting edge adapted to work in opposition to the cutting edge of the other member, a spring and other means for relatively bodily moving said cutting members from each other, in a course approximately perpendicular to said faces, and tilting one of said cutting members to make its cutting edge bear against the adjacent face of the other cutting member, substantially as described.

4. In a cutting mechanism, the combination of two cutting members one of which is rotary and each of which has a face over-lapping such face of the other cutting member and a portion of the edge of each such face being a cutting edge adapted to work in opposition to the cutting edge of the other member, yielding means, in part yielding, for relatively bodily moving said cutting members from each other, in a course approximately perpendicular to said faces, and tilting the rotary cutting member to make its cutting edge bear against the adjacent face of the other cutting member, substantially as described.

5. In a cutting mechanism, the combination of two cutting members one of which is rotary and each of which has a face over-lapping such face of the other cutting member and a portion of the edge of each such face being a cutting edge adapted to work in opposition to the cutting edge of the other member, means for yieldingly bodily moving said rotary cutting member from the other cutting member, in a course approximately perpendicular to said faces, and tilting said rotary cutting member toward the other cutting member to make its cutting edge bear against the adjacent face of the other cutting member, substantially as described.

6. In a cutting mechanism, the combination of two cutting members one of which is rotary and each of which has a face over-lapping such face of the other cutting member and a portion of the edge of each such face being a cutting edge adapted to work in opposition to the cutting edge of the other member, a spring and other means for relatively bodily moving said cutting members from each other, in a course approximately perpendicular to said faces, and tilting said rotary cutting member to make its cutting edge bear against the adjacent face of the other cutting member, substantially as described.

7. In a cutting mechanism, the combination of two cutting members one of which is rotary and each of which has a face overlapping such face of the other cutting member and a portion of the edge of each such face being a cutting edge adapted to work in opposition to the cutting edge of the other member, a spring and other means for bodily moving said rotary cutting member from the other cutting member, in a course approximately perpendicular to said faces, and tilting the rotary cutting member to make its cutting edge bear against the adjacent face of the other cutting member, substantially as described.

8. In a cutting mechanism, the combination of a rotary shaft, two cutting members having over-lapping faces to which said shaft is substantially perpendicular and each of which has a cutting edge adapted to work in opposition to such edge of the other member, one of said cutting members being mounted and keyed slidably and tiltably around said rotary shaft, and means for yieldingly tilting said cutting member relative to said shaft and moving said cutting members bodily from each other in a course parallel to said shaft while the cutting edges of said cutting members are relatively traversing each other, substantially as described.

9. In a cutting mechanism, the combination of a rotary shaft, two cutting members each having a face to which said shaft is approximately perpendicular and each such face over-lapping such face of the other cutting member and a portion of the edge of each such face being a cutting edge adapted to work in opposition to the cutting edge of the other member, one of said cutting members being mounted tiltably on said shaft for rotation therewith, and means for tilting said cutting member on said shaft during the rotation of the latter for pressing the cutting edge of said rotary cutting member against the cutting edge of the other cutting member, substantially as described.

10. In a cutting mechanism, the combination of a rotary shaft, two cutting members each having a face to which said shaft is approximately perpendicular and each such face over-lapping such face of the other cutting member and a portion of the edge of each such face being a cutting edge adapted to work in opposition to the cutting edge of the other member, one of said cutting members being mounted tiltably on said shaft for rotation therewith, and adjustable means for tilting said cutting member on said shaft during the rotation of the latter for pressing the cutting edge of said rotary cutting member against the cutting edge of the other cutting member, substantially as described.

11. In a cutting mechanism, the combination of a stationary cutting member, a rotary shaft, a rotary cutting member slidably and tiltably surrounding said shaft and overlapping the stationary cutting member, and means for moving said rotary cutting member bodily from and pressing its cutting edge against the stationary cutting member, substantially as described.

12. In a cutting mechanism, the combination of a relatively stationary cutting member, a second cutting member, means for supporting and turning said second cutting member adjacent the first cutting member, and tilting means comprising a fulcrum and a member for yieldingly bearing said second cutting member against said fulcrum to turn said second cutting member on said fulcrum and cause the cutting edge of said second cutting member to bear yieldingly against the other cutting member, substantially as described.

13. In a cutting mechanism, the combination of a relatively stationary cutting member, a second cutting member, means for supporting and turning said second cutting member at an angle to the first cutting member, and tilting means comprising a fulcrum and a member for yieldingly bearing said second cutting member against said fulcrum to turn said second cutting member on said fulcrum and cause the cutting edge of said second cutting member to bear yieldingly against the other cutting member, substantially as described.

14. In a cutting mechanism, the combination of a relatively stationary cutting member, a rotary cutting member, a rotary shaft on which said cutting member is loosely mounted, and tilting means comprising a fulcrum and a spring on said shaft for pressing said rotary cutting member against said fulcrum to turn said second cutting member on said fulcrum and cause the cutting edge of said rotary cutting member to bear yieldingly against the other cutting member, substantially as described.

15. In a cutting mechanism, the combination of a stationary cutting member, a rotary shaft, a rotary cutting member slidably mounted on said shaft, and a tilting means comprising an adjustable fulcrum and a spring applied to said rotary cutting member for yieldingly bearing said cutting member against said fulcrum to turn said rotary cutting member on said fulcrum and cause the cutting edge of said rotary cutting member to bear yieldingly against the other cutting member, substantially as described.

16. In a cutting mechanism, the combination of a relatively stationary cutting member, a second cutting member, means for supporting and turning said second cutting member adjacent the first cutting member, and tilting means comprising an adjustable fulcrum for yieldingly tilting the second cutting member to cause its cutting edge to bear yieldingly against the stationary cutting member, substantially as described.

17. In a cutting mechanism, the combination of a relatively stationary cutting member, a second cutting member, means for supporting and turning said second cutting member at an angle to the first cutting member, and tilting means comprising a fulcrum and a member for yieldingly bearing the second cutting member against said fulcrum to turn said second cutting member on said fulcrum and cause the cutting edge of said second cutting member to bear yieldingly against the other cutting member, substantially as described.

In testimony whereof I have signed my name, in presence of two witnesses, this 16th day of November, in the year one thousand nine hundred and eleven.

ERNEST KOELLA.

Witnesses:
CYRUS KEHR,
C. A. MORSE.

Copies of this patent may be obtained for five cents each, by addressing the "Commissioner of Patents, Washington, D. C."